(12) United States Patent
Innings et al.

(10) Patent No.: US 9,776,138 B2
(45) Date of Patent: Oct. 3, 2017

(54) MEMBRANE FILTRATION DEVICE HAVING A HYGIENIC SUSPENSION ARRANGEMENT

(71) Applicant: TETRA LAVAL HOLDINGS & FINANCE S.A., Pully (CH)

(72) Inventors: Fredrik Innings, Torna Hällestad (SE); Tomas Skoglund, Lund (SE); Jeanette Lindau, Södra Sandby (SE); Bengt Palm, Genarp (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 14/392,157

(22) PCT Filed: Jun. 25, 2014

(86) PCT No.: PCT/EP2014/063340
§ 371 (c)(1),
(2) Date: Dec. 23, 2015

(87) PCT Pub. No.: WO2014/207016
PCT Pub. Date: Dec. 31, 2014

(65) Prior Publication Data
US 2016/0271563 A1    Sep. 22, 2016

(30) Foreign Application Priority Data
Jun. 25, 2013  (SE) ........................ 1350771

(51) Int. Cl.
*B01D 63/00*    (2006.01)
*B01D 39/00*    (2006.01)
(Continued)

(52) U.S. Cl.
CPC ............. *B01D 63/082* (2013.01); *A01J 11/06* (2013.01); *A23C 7/00* (2013.01); *B01D 65/08* (2013.01);
(Continued)

(58) Field of Classification Search
CPC .. B01D 25/164; B01D 25/215; B01D 63/082; B01D 35/18; B01D 61/18; B01D 61/28;
(Continued)

(56) References Cited

U.S. PATENT DOCUMENTS 4,212,742 A  *  7/1980  Solomon ............... G01N 33/491
                                                    210/247
4,225,438 A  *  9/1980  Miller .................... B01D 63/10
                                                    210/321.74
(Continued)

FOREIGN PATENT DOCUMENTS

EP        0 108 025 A1      5/1984
EP        2 006 016 A1     12/2008
(Continued)

OTHER PUBLICATIONS

International Search Report (PCT/ISA/210) issued on Sep. 25, 2014, by the European Patent Office as the International Searching Authority for International Application No. PCT/EP2014/063340.

*Primary Examiner* — Ana Fortuna
(74) *Attorney, Agent, or Firm* — Buchanan Ingersoll & Rooney PC

(57) ABSTRACT

A membrane filtration device comprising:
  a retentate plate,
  a permeate plate, and
  a membrane sandwiched between the retentate plate and the permeate plate, wherein
  the retentate plate comprises at least one feed channel extending from a distribution manifold, and at least one drain channel extending from a collection manifold, wherein
  a feed channel is fluidly connected to a drain channel via through-holes extending from a first side of the retentate plate, from a feed channel, to an opposing second side of the retentate plate, and through-holes extending
(Continued)

from the second side of the retentate plate to the first side of the retentate plate, into a drain channel, wherein ridges extend from the retentate plate and/or the permeate plate for supporting the membrane.

18 Claims, 7 Drawing Sheets

(51) Int. Cl.
    *B01D 25/00*     (2006.01)
    *C02F 1/44*     (2006.01)
    *B01D 63/08*     (2006.01)
    *A01J 11/06*     (2006.01)
    *B01D 65/08*     (2006.01)
    *A23C 7/00*     (2006.01)
    *A23C 9/142*     (2006.01)

(52) U.S. Cl.
    CPC ........ *A23C 9/1422* (2013.01); *B01D 2313/04* (2013.01); *B01D 2313/143* (2013.01); *B01D 2313/19* (2013.01); *B01D 2321/2016* (2013.01)

(58) Field of Classification Search
    CPC .................. B01D 2313/086; B01D 69/06; B01D 63/084; G01N 15/08
    See application file for complete search history.

(56) References Cited

U.S. PATENT DOCUMENTS

| 4,624,778 | A | 11/1986 | Clermont et al. | |
|---|---|---|---|---|
| 5,258,122 | A * | 11/1993 | Ha | B01D 61/18 210/137 |
| 5,681,464 | A | 10/1997 | Larsson | |
| 6,171,374 | B1 * | 1/2001 | Barton | B01D 63/081 210/321.75 |
| 6,368,505 | B1 * | 4/2002 | Grummert | B01D 63/084 210/231 |
| 2002/0139741 | A1 * | 10/2002 | Kopf, III | B01D 25/26 210/224 |
| 2006/0163141 | A1 * | 7/2006 | Weinstein | B01D 63/084 210/321.72 |
| 2009/0145831 | A1 * | 6/2009 | Manabe | B01D 63/082 210/232 |
| 2012/0305500 | A1 * | 12/2012 | Bormann | B01L 3/502753 210/808 |
| 2014/0096594 | A1 | 4/2014 | Manabe et al. | |
| 2014/0116934 | A1 * | 5/2014 | Manabe | B01D 63/082 210/500.3 |
| 2016/0354726 | A1 * | 12/2016 | Innings | B01D 63/082 |

FOREIGN PATENT DOCUMENTS

| EP | 2 564 919 A1 | 3/2013 |
|---|---|---|
| WO | WO 88/03829 A1 | 6/1988 |
| WO | 03084649 A1 | 10/2003 |

\* cited by examiner

MEMBRANE FILTRATION DEVICE HAVING A HYGIENIC SUSPENSION ARRANGEMENT

TECHNICAL FIELD OF THE INVENTION

The present invention relates to a membrane filtration device, and in particular to a hygienic suspension arrangement for a filter membrane of such a device.

BACKGROUND

Membrane filtration, or membrane technology for filtration, is a technique which is increasingly used in production of milk, such as milk with extended shelf life (ESL milk), or milk for manufacture of cheese (Cheese milk), etc. with the purpose of separating one or more components of the product from the rest. More particularly the present application will find its use in cross-flow filtration, involving guiding two parallel flows with a filter arrangement therebetween. The first flow comprises the raw material, referred to as 'feed material' containing one or more unwanted components, and the second flow, on the other side of the filter comprises a permeate (filtrate), i.e. the portion of the product which could pass through the filter. The part being left in the first flow after filtering is called the retentate (concentrate). For completeness this may be compared with dead-end filtration where a product is forced through a filter or sieve and the only way out is through the filter or sieve.

The process is driven by a pressure difference across the filter or membrane, and this pressure difference is referred to as transmembrane pressure (TMP).

In membrane filtration, there are different configurations of filtration modules that are used. A common feature for the basic layout is that there is an infeed and an outfeed on the retentate side, whereas there is only an outfeed on the permeate side Another common feature is that the filtration modules have a modular design, such that two or more modules may be coupled in series or in parallel to conform to the needs of a user.

A first type is the tubular design, which is a design similar to a tubular heat exchanger. The product/retentate is lead through small-diameter tubes in a bundled configuration, there is generally no contact between adjacent tubes. The small-diameter tubes comprise the membrane and the bundle of small-diameter tubes are arranged in a large-diameter tube or shell. The void between the outer perimeter of the small-diameter tubes and the shell provides the permeate side. The membranes may for example be formed from polymers or ceramics. One example of such configuration is disclosed in EP0333753.

Two other designs are the hollow-fibre designs and the spiral wound design, which will not be described in any detail in the present application.

The present application is primarily directed to filtration modules having a plate and frame design, a design which to some extent may be compared with the design of a plate heat exchanger. The feed material is driven along narrow channels in contact with one side of the membrane, and on the opposite side of the membrane the permeate may be collected. Several filtration modules may advantageously be arranged in a stack, in a parallel coupled configuration.

Two critical parameters in regard of microfiltration in general, and in microfiltration of food products in particular, are hygiene and capacity. Improvements in these parameters will have a direct impact on the capacity of a microfiltration device, for obvious reasons. The present application aims at providing an improvement on one or both these parameters. In regard of microfiltration performance the transmembrane pressure is a key parameter.

SUMMARY OF THE INVENTION

The present invention aims at providing a new and improved microfiltration device in accordance with the independent claims, which microfiltration device eliminates at least alleviates problems experienced in prior art. To this end and according to a first aspect the present invention provides a membrane filtration device comprising a retentate plate, a permeate plate, and a membrane sandwiched between the retentate plate and the permeate plate. The retentate plate comprises at least one feed channel extending from a distribution manifold, and at least one drain channel extending from a collection manifold, and a feed channel is fluidly connected to a drain channel via through-holes extending from a first side of the retentate plate, from a feed channel, to an opposing second side of the retentate plate, and through-holes extending from the second side of the retentate plate to the first side of the retentate plate, into a drain channel. The device is characterized in that ridges extend from the retentate plate and/or the permeate plate for suspending the membrane.

The advantage of using ridges formed in the plates as such, rather than adding an additional gasket will be apparent from the following detailed description.

In one or more embodiments it is preferred that ridges extend in parallel and wherein filter channels are defined between adjacent ridges.

In this or other embodiments the ridges may follow a structure of an interposed membrane filter, and this many different shapes are envisaged.

In one or more embodiments the ridges may have a triangular cross section, the free edge of which supports the filter. This configuration offers a sturdy support having a wide base, while the contact between the membrane and the ridge is minimized for the benefit of hygienic issues. The obtuse angle at the base will prevent sharp corners from being formed, and the sharp free edge being in contact with the membrane will minimize the formation of crevices. Both these measures will act beneficial to hygien, i.e. the device will be easier to clean and to keep clean. To provide a more gentle engagement with the membrane the free edge may be provided with a radius instead of being sharp.

For further improvement of the suspension the membrane may, in one or more embodiments, be further suspended by a seal arranged along the periphery of the membrane, between the membrane and the retentate plate and/or between the membrane and the permeate plate.

It is preferred that the seal has a dumbbell cross-sectional shape, enabling it to be securely positioned an undercut groove of the retentate plate or the permeate plate. In one or more embodiments a first free end of the seal consequently is arranged in an undercut groove of the retentate plate and/or of the permeate plate, while a second free end of the seal is arranged to be clamped between the membrane and the retentate plate and/or between membrane and the permeate plate.

In one or more embodiments the second free end has a sloped design, where an edge abutting the membrane extends further radially inwards than edge portions further away from the membrane, which is a construction that may eliminate the formation of a sharp corner between the seal and the membrane.

BRIEF DESCRIPTION OF THE DRAWINGS

A vital part of a microfiltration device according to one embodiment of the present invention is comprised by a retentate plate, a permeate plate, and a membrane arranged therebetween, which will be described in detail referring to the appended drawings in which.

DETAILED DESCRIPTION OF PREFERRED EMBODIMENTS

In the following the invention will be described in more details, by means of specific embodiments thereof. Yet, before going into details some general aspects of a filtration device will be disclosed with the purpose of facilitating the understanding of the present invention according to embodiments thereof. In the following general description some parts are well known while some parts may belong to the invention. In particular, FIGS. 1-6 disclose features which in a general sense would be considered well known to a person skilled in the field of microfiltration. Still, for the technically trained reader not being an expert in microfiltration may find that the short description may facilitate appreciation of the invention as such.

In the below description the term 'feed' is used for the material to be processed prior to it being exposed to the membrane while the term 'retentate' is used for the material to be processed after it has been exposed to the membrane. The purpose is to simplify the explanation of the construction, while in reality the feed will in most cases comprise a mixture of material to be processed and retentate due to a recirculation process, as is well known for the skilled person.

The three main components are the retentate plate 200, the permeate plate 300, and the membrane 51. The membrane 51 is sandwiched between the retentate plate 200 and the permeate plate 300, and the membrane is preferably an inorganic filter, such as ceramic-based or silica based, since organic membranes tend to degenerate during a cleaning process. The membrane may have a homogeneous structure (like a cloth or a ceramic structure) or it may have a more elaborate layout. The more elaborate membranes have a well defined structure similar to a honeycomb structure. Though not necessarily hexagonal in shape the filter is constituted by individual cells or blocks of cells, the function of which may vary. For the purposes of the present invention, however, the exact choice of membrane is not a main issue.

Figure 1:
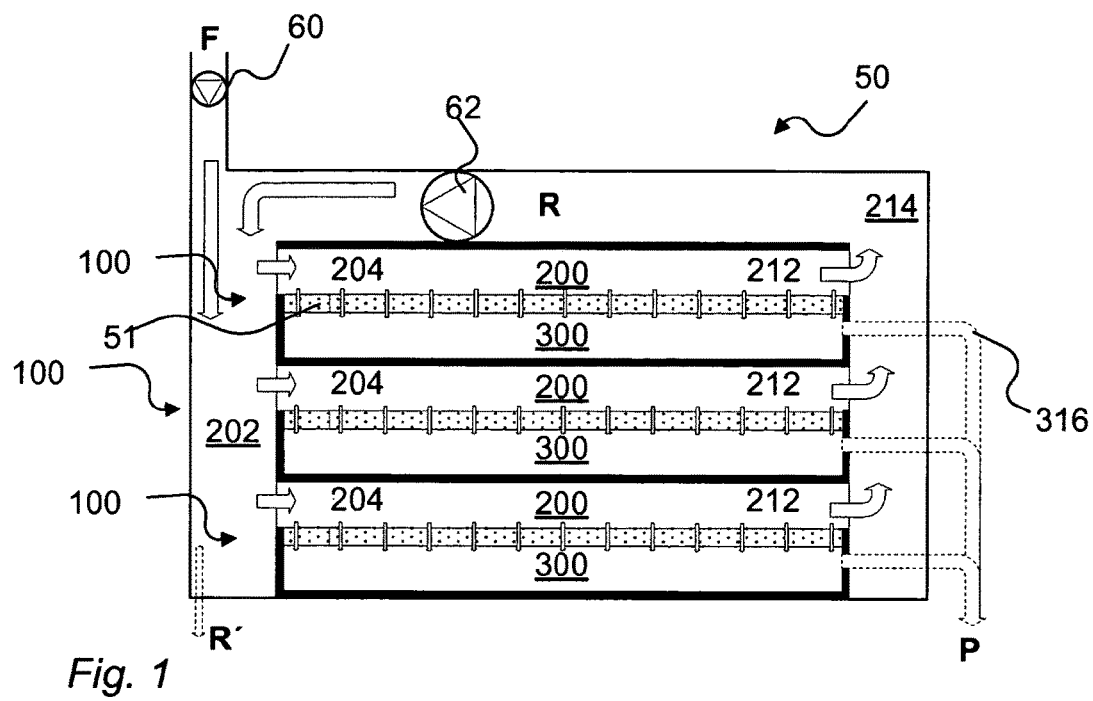
FIG. 1 is a sectional view of a schematic stack of filtration devices.

FIG. 1 is a schematic view showing a section of a stack of filtration devices 100 forming a filtration unit 50. While the present invention to a first approximation will relate to features of a single filtration device/filtration module, in most fields of use several filtration devices are used in combination, in order to achieve a required performance level. Several (micro)filtration devices may therefore be arranged in a stacked manner, which is what is shown in the sectional view of FIG. 1. The filtration unit 50 comprises several filtration devices 100 arranged in a stacked manner. A feed F of raw material enters the unit 50 and is forced through the system by e.g. a pump 60. The feed then enters a feed/retentate channel 202 acting as a distribution manifold being in fluid communication with each filtration device 100. The feed then enters a filtration module via a feed channel 204, and exits the module via a drain channel 212 into a collection manifold 214. On its way through the filtration module the feed has passed along a filter membrane 51 and portion of the feed has passed the membrane 51 thus forming the permeate portion. The permeate P is collected and exits the filtration unit 100 via the permeate channel 316 while about 90% of the retentate R is recirculated into the feed/retentate channel 202. About 10% of the retentate R' is bled off the filtration device, and is forwarded to a consecutive filtration device 100. A feed F flow compensating for the loss off retentate R' and permeate P is added to complete the continuous cycle of the filtration device 100.

Figure 2:
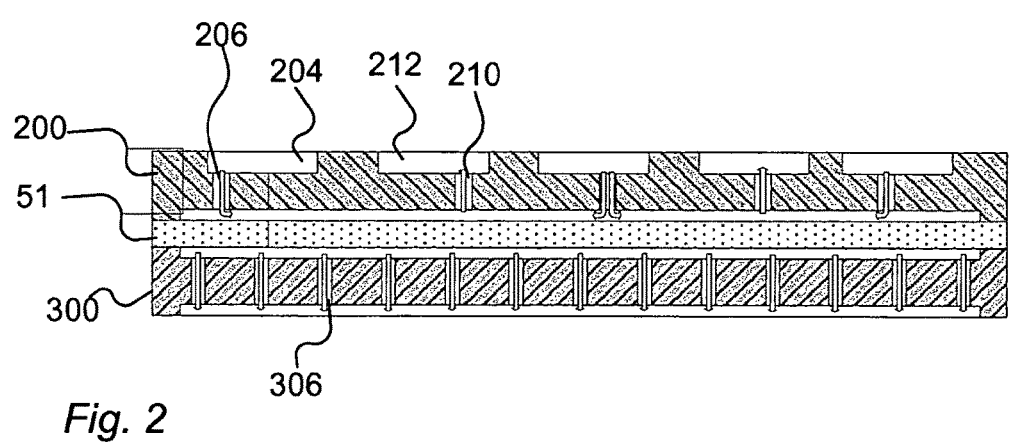
FIG. 2 is a sectional view of a schematic filtration device.

In FIG. 2 a sectional view of a filtration module 100 is shown in greater detail, though it is still a schematic view. It is shown how a retentate plate 200 comprises on a first side feed channels 204 leading a feed of unfiltered material (mixed with retentate) from a distribution manifold (not shown in FIG. 2) to a filter area, as well as drain channels 212 leading retentate material to a collection manifold (not shown in FIG. 2). The feed channels 204 and the drain channels 212 are separated on the first side of the retentate plate 200, such that no mass transfer between the channels occurs on that side, and the transfer from the feed channels 204 to the drain channels 212 will be described in the following paragraph. But first, to complete the cycle: from the collection manifold 214 the retentate is recirculated into the distribution manifold 202 and again introduced into the feed channels 204. This recirculation is controlled, e.g. by control of mass flow and pressure in the system. Each drain channel 212 extends from a closed end located towards the distribution manifold 202 in the direction of the collection manifold 214, where it has its open end, or outlet. The filtration unit 50 comprises at least one feed/retentate channel 202, extending from the inlet to the retentate outlet along the flow path already described, through which feed F gradually turns into retentate R. The feed/retentate channel extends adjacent the filter area, where a microfiltration filter or membrane may be arranged, also according to the previous description. The filter unit 50 further comprises at least one permeate channel, extending from the filter to the permeate outlet P. Liquid passing from the feed F over the filter constitutes the permeate, which in turn exits the filter unit 50 at the permeate outlet. The filtration unit 50 may be divided into sections, in each of which the flow between pairs of filtration device.

Returning now to the fluid connection between feed channels 204 and drain channels 212 and to FIG. 2. Each feed channel 204 comprises several through-holes 206 through which the feed passes to a second side of the retentate plate 200. The second side of the retentate plate 200 comprises filter channels 208 (not shown in FIG. 2) extending in an approximate cross direction of the "fingers" 204/212. Each filter channel 208 has an elongate cross section and is delimited by the membrane on one side, the retentate plate 200 on the opposing side. In this way the feed is guided from one feed channel 204 to a neighboring drain channel 212, which drain channel 212 by necessity also comprises through-holes 210 for the retentate to pass to the first side of the retentate plate 200, after which it continues to the collection manifold 214, as described in the above paragraph. This description will be more easily understood if read in conjunction with FIG. 3 too.

Figure 3:
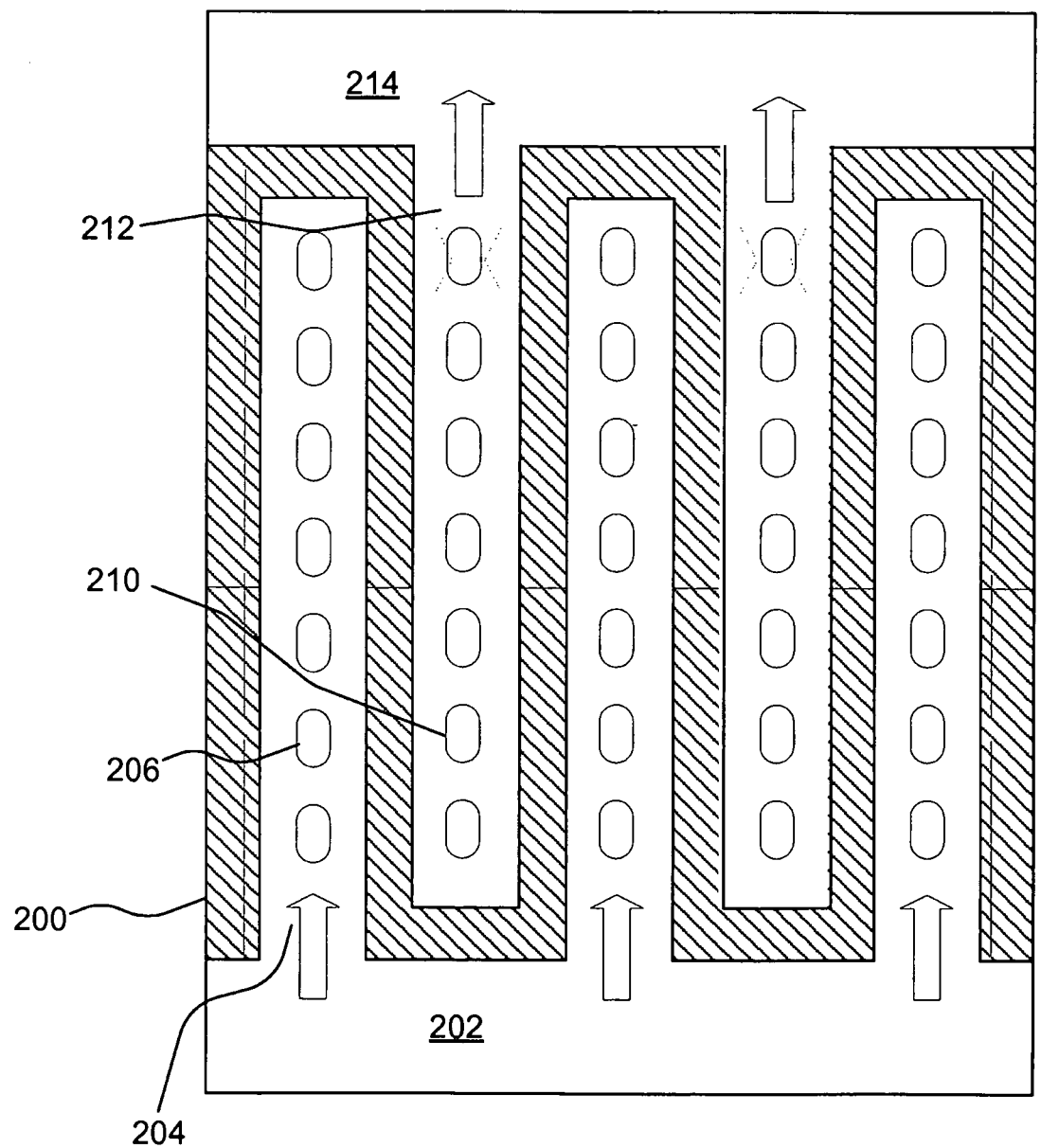
FIG. 3 is a plan view of a schematic retentate plate showing a first side thereof.

Referring to FIG. 3, the retentate plate 200 comprises on a first side "fingers" 204, i.e. the feed channels 204 leading a feed of unfiltered material (mixed with retentate) from a distribution manifold 202 to a filter area, as well as drain channels 212 leading retentate material to a collection manifold 214. The feed channels 204 and the drain channels 212 are separated on the first side of the retentate plate 200, such that no mass transfer between the channels occurs on that side, and the transfer from the feed channels 204 to the drain channels 212 was described in the above paragraph. To complete the cycle and to refer back to FIG. 1: from the collection manifold 214 the major portion of the retentate is recirculated into the distribution manifold 202 and again introduced into the feed channels 204 where it is mixed with a smaller fraction of fresh feed. This recirculation is controlled, e.g. by control of mass flow and pressure in the system, e.g. by a recirculation pump 62 (see FIG. 1). Each drain channel 212 extends from a closed end located towards the distribution manifold 202 in the direction of the collection manifold 214, where it has its open end, or outlet. Drain channels 212 as well as feed channels 204 may have a shape differing from a rectilinear shape, which is clearly the case for illustrated embodiment. This type of recirculation system is referred to with the descriptive term "feed and bleed system", and details of auxiliary components (pumps, valves etc.) will not be discussed any further here.

Figure 4:
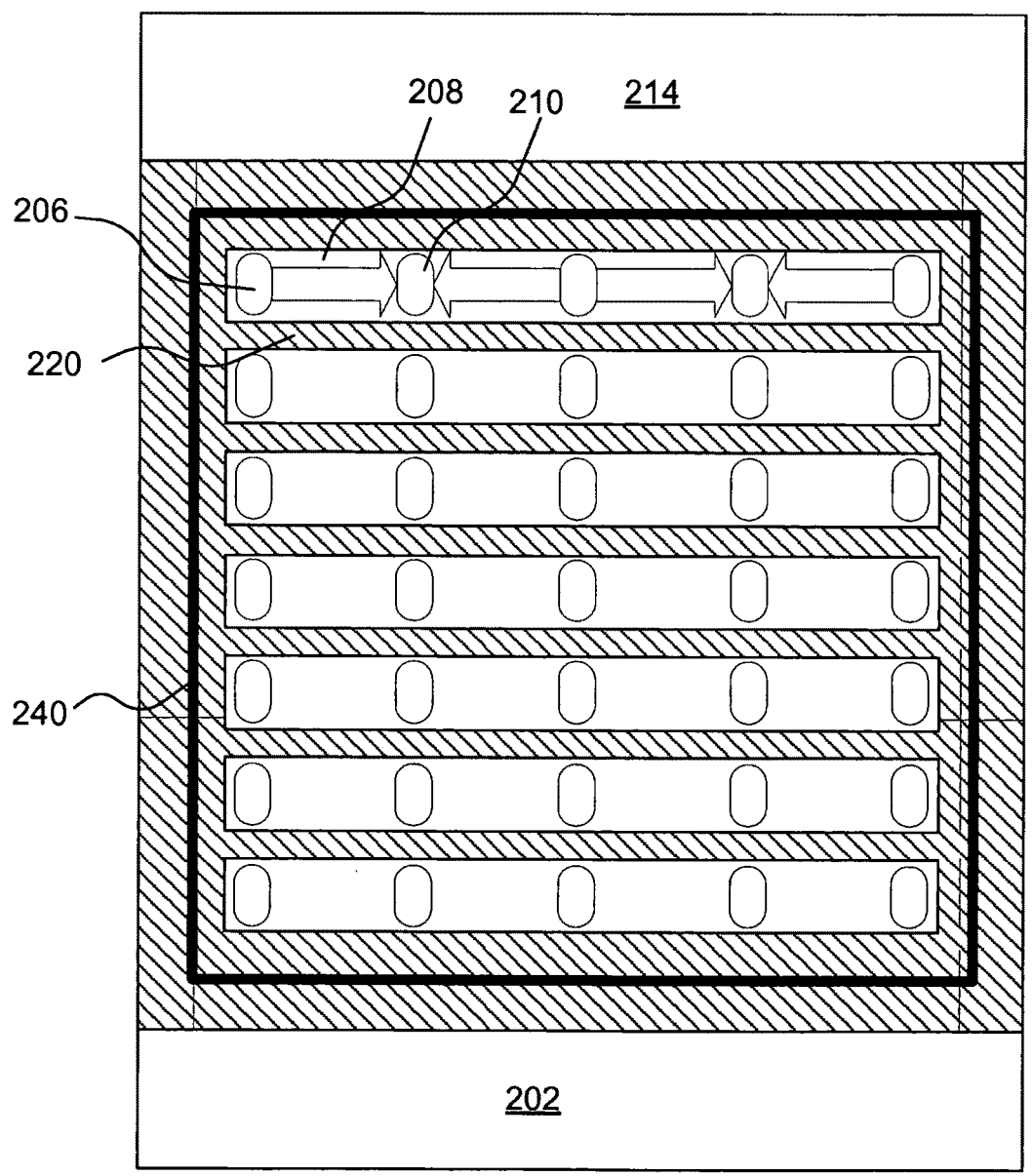
FIG. 4 is a plan view of the retentate plate of FIG. 1, showing the second side thereof.

Turning now to FIG. 4 where the second side, opposing the first side, of the retentate plate is shown. This second side comprises the previously mentioned filter channels 208 extending in an approximate cross direction of the "fingers" 204/212. It has also been mentioned how each filter channel 208 has an elongate cross section and is delimited by the membrane on one side and the retentate plate 200 on the opposing side. The channel shape is completed by two lateral walls 220 extending between the membrane 51 and the retentate plate 200. In one embodiment a part of the lateral walls 220 comprises a gasket defining the channels as well as being configured to provide a seal along a periphery of the membrane and the retentate plate 200. A similar gasket may be provided on the first side of the permeate plate, the benefit of which will be more easily appreciated when studying the corresponding description of the permeate plate 300 (on a general note it should be considered apparent that gaskets are used wherever necessary, even if they are not illustrated in the attached drawings). In this way the feed is guided from the through-holes 206 of a feed channel 204 to through-holes 210 of a neighboring drain channel 212, as indicated by the arrows shown in FIG. 4. There are no constraints in the direction of the filter channel 208 and the fluid (the feed/retentate) will follow the path of least resistance. Once returning to the first side of the retentate plate 200 the retentate continues to the collection manifold 214, as described.

Figure 5:
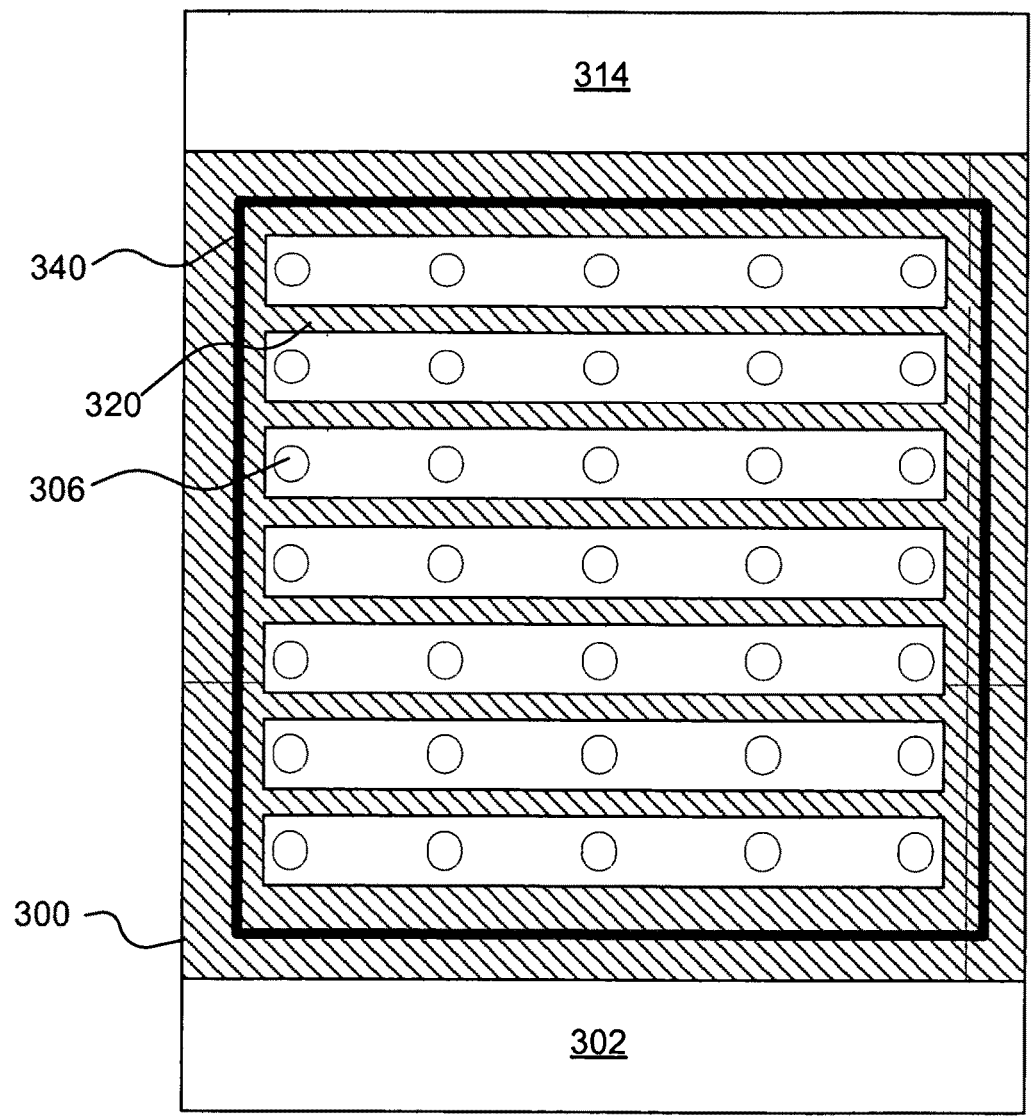
FIG. 5 is a plan view of a schematic permeate plate showing a first side thereof.
Figure 6:
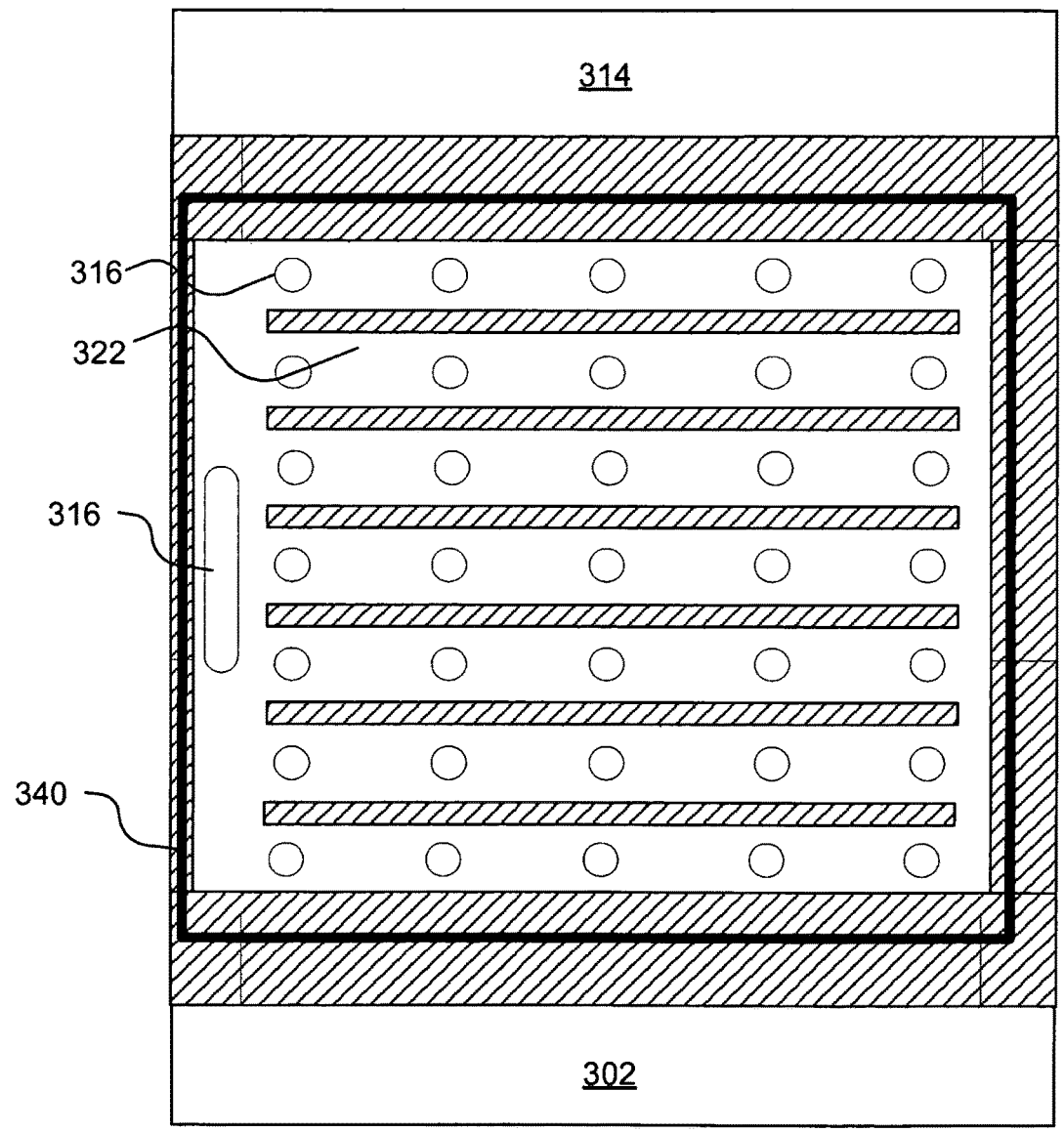
FIG. 6 is a plan view of the permeate plate of FIG. 6, showing the second side thereof.
Figure 7:
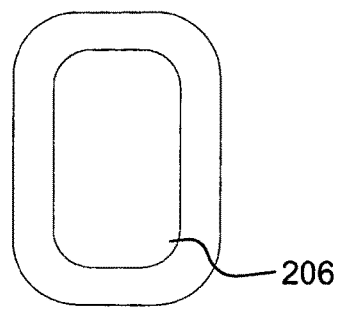
FIG. 7 illustrates a through-hole of a permeate plate.

As pointed out, the membrane 51 will constitute one sidewall of the filter channel 208, through which the feed flows, and the transmembrane pressure will force selected portions of the feed through the membrane 51. What the 'selected portions' are, is defined by the properties of the membrane, and the portion having passed through the filter is called the permeate. On the permeate side of the membrane 51 the permeate plate 300 is arranged, which will be described in some more detail referring to FIG. 5 showing a first side of the permeate plate 300 and FIG. 6 showing a second side of the permeate plate 300. The permeate plate 300 comprises a set of channels 308 extending along a first side thereof, as shown in FIG. 5, and through-holes 306 are distributed along the channels such that the permeate may pass from the first side of the permeate plate 300 to the second side. The channels 308 on the first side of the permeate plate 300 preferably match the size and position of the channels 208 on the second side of the retentate plate 200, and in particular the position of the lateral walls 220 on the retentate plate 200 correlate with corresponding lateral walls 320 of the permeate plate 300 such as to support the membrane from opposing sides. Once on the second side, see FIG. 6, collection channels 322 leads the permeate to a collection manifold 316 and out from the microfiltration device. It should be noted that when the microfiltration device is in an assembled state the distribution manifold 202 of the retentate plate 200 will overlap and fluidly connect with the distribution manifold 302 of the permeate plate 300. The "distribution manifold" 302 is merely a bypass line which fluidly connects a distribution manifold 202 of a retentate plate 200 adjacent one side thereof with a distribution manifold 202 of a retentate plate 200 adjacent on another side thereof. The distribution manifold 302 actually does not perform any distribution for the permeate plate 300, and the only purpose of the distribution manifold 302 of the permeate plate 300 is to forward the feed to a consecutive retentate plate 200 and to form a part of a recirculation system, which is readily understood when read in conjunction with FIG. 1. An analogous reasoning is valid for the "collection manifold" 314. Gaskets are preferable arranged between the retentate plate 200 and the permeate plate 300 along the periphery of the distribution manifold, and also along the periphery of any overlapping opening of the two plates.

To form a stack of filtration modules as the one shown in FIG. 1 an impermeable plate, not shown, may be arranged on top of the permeate plate 300, on the second side thereof, and if applicable on the first side of the retentate plate 200. The impermeable plate is designed and adapted to allow passage of fluids where that is appropriate, such as between distribution manifolds and collection manifolds, and to prevent passage of fluids in other locations. In this way several microfiltration devices may be arranged in a stacked mode where the distribution manifolds 202, 302 and the collection manifolds 214, 314 are connected in series while the portions involved in filtration are connected in parallel.

The retentate plate as well as the permeate plate are formed in one piece each. They are preferably formed from a food grade plastic material having the correct properties yet they may also be machined from food grade stainless steel, which is a more durable material. An inventive device may also be formed from other types of material, which of course should have the right properties for the intended use.

Two important parameters for the performance of a microfiltration device are the Trans-Membrane Pressure (TMP) and the cross-flow velocity. These parameters are in turn the effect of other control parameters as well as constructional parameters. A typical control parameter may be the flow velocity through a channel, and a typical constructional parameter could be the design of filter channels. The TMP drives transport of fluid through the membrane for obvious reasons, and will thus affect the cross-flow velocity, the rate at which product passes the membrane.

Also the flow velocity through the filter channel may affect the composition of the fluid in the immediate vicinity of the membrane, as well as affecting the rate at which the membrane is clogged up (the flow will be have a rinsing effect on material clogged on the retentate side of the filter). If either of these parameters varies between different filter channels the performance of the filter will be unpredictable or at least non-optimized. One reason for this may e.g. be that the channel having the highest TMP will filter the largest amount of fluid to begin with, yet after a while the filter will clog up. In this way the entire membrane will gradually clog up, leading to a not result in optimal use of the microfiltration device.

According to a first aspect the present invention relates to the arrangement in connection to a suspension of the membrane 51 and to the related sealing between the retentate plate 200 and the membrane (or the permeate plate and the membrane). These are related in that according to previous techniques they were both provided by the same gasket, formed in one piece. That particular gasket sealed towards the periphery of the membrane 51, and comprised parallel chords forming the filter channels 208 (see FIG. 4), the parallel chords corresponding to a part of the lateral walls 320 discussed earlier. The layout of the prior art gasket may be compared to that of a cylinder head gasket for a combustion engine, where a gasket shape has been punched from a flat gasket material.

Figure 9:
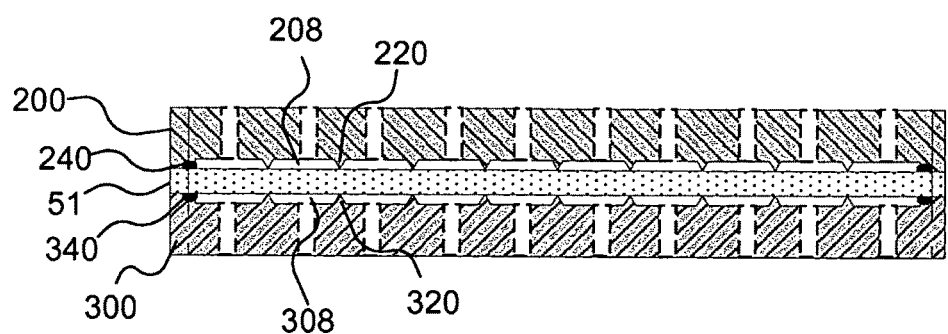
FIG. 9 is a schematic sectional view illustrating the suspension of a membrane between a retentate plate and a permeate plate.

In the present invention, as further illustrated in FIG. 9 the gasket has been replaced by two components, one perimeter seal 240 (340, 440) extending around the perimeter of the membrane 51 and seals the membrane 51 in relation to the retentate plate 200. The second 'component' is a series of ridges 220 in the retentate plate 200, which ridges 220 define the filter channels 208. The same reference numeral is used as for the lateral walls 220, since the position and purpose is essentially the same, though not the design and function. The ridges 220 are preferably of equal height and have a triangular cross section with the pointy end facing the membrane, as is shown in FIG. 9. The pointy end may have a small radius not to cause damage to the membrane. The height of the ridges 220 is dimensioned such that the pointy end is in contact with the membrane 51 as the microfiltration device is in an assembled mode, i.e. when the microfiltration device is in a use mode.

This embodiment has several advantages as compared to previous solutions. The advantages considered most relevant are the ones that are connected to increased hygiene. The present solution provides a secure seal between the retentate plate 200 and the membrane 51 along the periphery thereof, by means of the seal 240. In this way leakage from the retentate side to the permeate side is efficiently prevented. Any such leakage would for obvious reasons have a negative impact on the permeate (and thus on the product coming out of the microfiltration device). Leakage between neighboring filter channels 208 on the other hand would not be as severe, since this occurs purely on the retentate side of the filter 51, and by removing the gasket in this area the hygiene of the microfiltration device 200 is improved in that it will be easier to clean. A solution where the pointy end of the ridge 220 (320) is sharp rather than curved would make the device even easier to clean.

According to one or more further embodiments the permeate plate 300 is provided with analogous features, i.e. ridges 320 and/or seals 340, which will not be discussed in any further detail (see FIG. 9).

A main purpose with the ridges 220, 320 is to guide the flows of retentate and permeate, yet another purpose is to support the membrane such that it does not break or collapses under the TMP or any other pressure load, e.g. during cleaning of the microfiltration device. A ridge 220, 320 should therefore preferably extend such that it supports the membrane fully, which means that the ridges extends like parallel chords in relation to the seal such as is illustrated in the drawings. The necessity of full support depends on the qualities of the membrane and on the conditions during operation of the microfiltration device. Higher differential pressures between the retentate side and the permeate side of the filter will increase the need for support as compared to lower differential pressures. Embodiments where the ridges do not extend over the full membrane but rather follow the extension of the filter channels should therefore not be excluded. Turning back to the description in relation to membrane filters; in cases where the membrane filter has a defined structure, such as a honeycomb structure or similar (e.g. having quadratic rather than hexagonal cells) the ridges may follow the extension of a delimiter separating neighboring cells. In this way the ridge will not hamper a valuable filter area.

The extension of the seal 240, 340 is indicated in FIG. 2 and also in FIG. 4, and other locations where the seal may be applied are around distribution manifolds and collection manifolds, basically where fluid-transporting channels meet and where leakage is unwanted. The seal extends along the periphery of the membrane, radially inside of its outside circumference and thus has a sealing contact with a surface of the membrane and the retentate plate 200 in that position.

The use of an individual seal is an advantage, as is the use of ridges, and the combination thereof, yet further advantages may lie in the design of the seal 240, 340, 440.

Figure 11:
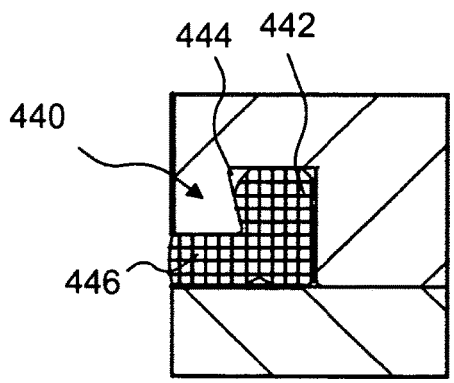
FIG. 11 is a detailed view in section of a seal member according to a second aspect of the present invention, in accordance with one embodiment thereof.
Figure 12:
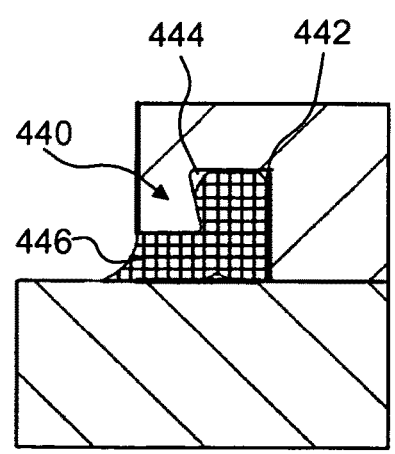
FIG. 12 is a view similar to FIG. 10 showing a second embodiment of an inventive seal member.

In the embodiment of FIG. 11 and FIG. 12 it is shown how the seal 440 may have a dumbbell shaped cross section.

In the particular embodiment shown the seal 440 has a first free end 442 (in its cross sectional shape), which is adapted for insertion into an undercut groove 444 in the plate 200/300. In this way the seal 440 is readily attached to the plate 200 thanks to the dumbbell shape of the seal. A second free end 446 of the seal 440 extends radially inwards, and this free end 446 effects the seal when compressed. In this way the attachment between the seal 440 and the plate 200/300 will not be subjected to any fluid (retentate or permeate), which is beneficial from a hygienic standpoint. In a further embodiment, as exemplified in FIG. 12, the second free 446 end may have a sloped design, where the edge abutting the membrane extends further radially inwards than edge portions further away from the membrane, such as to eliminate sharp crevices or corners and thus for increasing the hygiene. Another feature of the seal, which is readily visible in FIG. 11.

The seal is preferably formed from synthetic resin suitable for the intended use, such as EPDM or similar.

Another aspect of the present invention relates mainly to the trough openings provided in the retentation plate, as well as the "fingers" with which they are in fluid connection. Put differently, the second aspect of the present invention relates to components involved in the recirculating flow of the retentate side, from the distribution manifold to the collection manifold.

Figure 8:
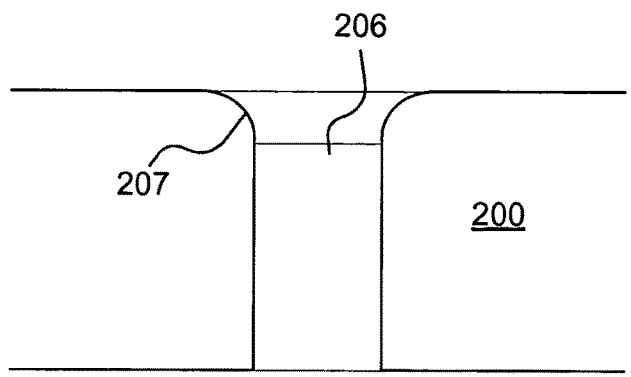
FIG. 8 is a sectional view of the through-hole of FIG. 7.

According to this second aspect of the invention the through-holes of the retentate plate may have a chamfered inlet edge facing the retentate side, such as to give the through holes a funnel-like inlet. In FIG. 8 this chamfered inlet edge is depicted as having a radius, yet for ease of manufacture it may simply be chamfered at an angle, and for the purpose of defining the scope of the invention it may be chamfered in any suitable way resulting in an opening towards the retentate plate having an increased cross section as compared to other portions of the through-hole. Also, in the view of FIG. 8 there is a chamfered edge all around the circumference of the through-hole, yet other embodiments comprises a chamfered edge which extends only along a portion of the circumference. One example would be that the edge facing upstream, i.e. the edge which will meet the flow first, is chamfered, while the remainder of the circumference is not. This will decrease the pressure drop in relation to the through hole, to the benefit of the filtration process. Lower pressure drop over the hole and higher flow rate. As illustrated in the drawings some or all of the through-holes may have a racetrack shape (rectangular with rounded corners, wherein the rounded corners may be rounded in such a way that the shorter side of the rectangular shape transforms into a semicircle, like a racetrack). This shape results in a larger area, i.e. a higher flow rate and a lower pressure drop over the hole as compared to a hole having a circular cross section.

Figure 10:
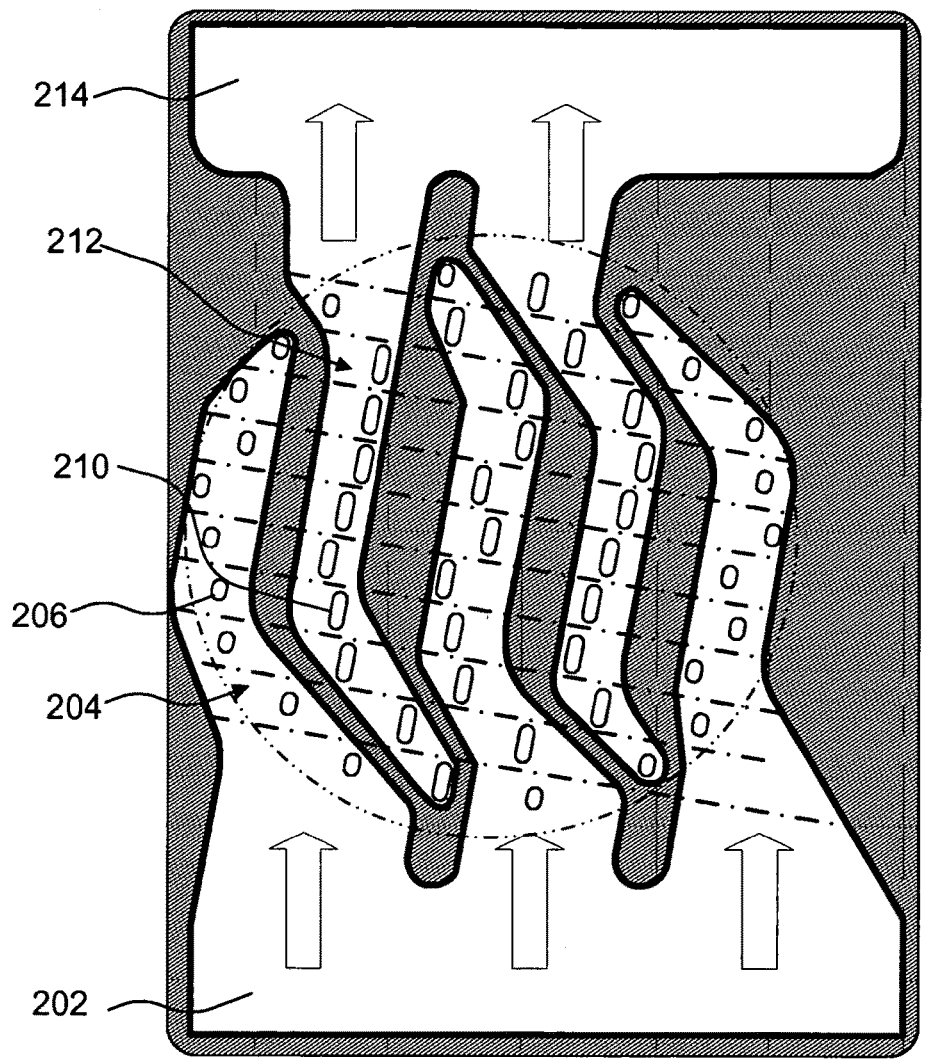
FIG. 10 is a plan view of a retentate plate according to a second embodiment of the present invention, the view is comparable to that of FIG. 3.

As shown in FIG. 10 the feed channels 204 and the drain channels 212 may have a slightly more complicated shape than what is disclosed in the other drawings. Some features worth mentioning are:

The feed channel 204 may have an elongate shape, wherein an inlet end has a larger cross section than the rest of the feed channel, having the effect of a continuous velocity and pressure over the channel 204. This feature may also be applied to the drain channel 212.

The feed channel 204 may have a shape such that the flow is deflected once or twice, e.g. by comprising straight segments separated by curved segments, as is exemplified in the FIG. 10. If this feature is applied to the feed channel(s) it may also affect the drain channel(s), rendering them having a similar shape.

An end portion of the feed channel 204 may have a tapered shape.

It may also worth noticing in the embodiment illustrated in FIG. 10 how the feed channels and drain channels are arranged at angle, which is noticeable when comparing this embodiment with the previous embodiment. The dash dotted lines in FIG. 10 indicates the extension direction of the ridges 220, and this will be replicated in the permeate plate too, and this affect the entire design of a filtration module 100. Also, in the embodiment of FIG. 10 the membrane filter 51 has an essential circular shape, which is indicated by the dash-double dotted line in FIG. 10. The circular shape is not an essential feature of the present invention, yet in an embodiment where the filter membrane has a circular shape it will obviously affect other constructional features of other components, such as the shape of the seal 240, the seal 340, the extension of the filter channels 208, the extension of the corresponding channels 308 in the permeate plate, and the collection channels 322 in second side of the permeate plate 300.

The present invention has been described in reference to a microfiltration device. It should be noted that the layout according to the present invention in any embodiment thereof may be used for other filtration than microfiltration, basically by using a filter membrane with another performance. Not to cause confusion regarding the intended scope of the claims, the more generic term cross-flow filtration device is therefore used.

The invention claimed is:

1. A membrane filtration device comprising:
   a retentate plate;
   a permeate plate;
   a membrane sandwiched between the retentate plate and the permeate plate;
   the retentate plate comprising at least one feed channel extending from a distribution manifold, and at least one drain channel extending from a collection manifold;
   the feed channel being fluidly connected to the drain channel via through-holes extending from a first side of the retentate plate, from a feed channel, to an opposing second side of the retentate plate, and through-holes extending from the second side of the retentate plate to the first side of the retentate plate, into the drain channel;
   a space extending between the membrane and the second side of the retentate plate, and fluidly connecting the through-holes which extend from the feed channel and the through-holes which extend to the drain channel; and
   ridges extending from the retentate plate and/or the permeate plate for suspending the membrane.

2. The membrane filtration device of claim 1, wherein the ridges extend in parallel and wherein filter channels are defined between adjacent ridges.

3. The membrane filtration device of claim 1, wherein the ridges have a triangular cross section, the free edge of which supports the filter.

4. The membrane filtration device of claim 3, wherein the free edge is sharp such that the free edge possesses two adjacent surfaces that are angled relative to one another.

5. The membrane filtration device of claim 3, wherein the free edge has a radius.

6. The membrane filtration of claim 1, wherein the ridges have a rectilinear extension.

7. The membrane filtration device of claim 1, wherein the membrane is further suspended by a seal arranged along the periphery of the membrane, between the membrane and the retentate plate and/or between the membrane and the permeate plate.

8. The membrane filtration device of claim 7, wherein the seal has a dumbbell cross-sectional shape.

9. The membrane filtration device of claim 7, wherein a first free end of the seal is arranged in an undercut groove of the retentate plate and/or of the permeate plate.

10. The membrane filtration device of claim 9, wherein the second free end has a sloped design, where an edge abutting the membrane extends further radially inwards than edge portions further away from the membrane.

11. The membrane filtration device of claim 7, wherein a second free end of the seal is arranged to be clamped between the membrane and the retentate plate and/or between membrane and the permeate plate.

12. A cross-flow filtration device comprising:
   a retentate plate possessing oppositely facing first and second sides;
   a permeate plate possessing oppositely facing first and second sides;
   a membrane sandwiched between the retentate plate and the permeate plate so that the second side of the retentate plate and the second side of the permeate plate face the membrane;

the retentate plate comprising a plurality of feed channels each fluidly connected with and extending from a distribution manifold, the plurality of feed channels being located on the first side of the retentate plate;

the retentate plate also comprising a plurality of drain channels each fluidly connected with and extending from a collection manifold, the plurality of drain channels being located on the first side of the retentate plate;

each of the feed channels being fluidly connected to one of the drain channels by way of a plurality of first and second through holes that each extend completely through the retentate plate;

the first through holes being fluidly connected to the feed channel and extending away from the first side of the retentate plate;

the second through holes extending away from the second side of the retentate plate and opening into the drain channel;

a space extending between the membrane and the second side of the retentate plate, and fluidly connecting the first through holes and the second through holes; and at least one of the second side of the retentate plate and the second side of the permeate plate including a plurality of spaced-apart ridges projecting towards the membrane and in contact with the membrane to suspend the membrane relative to the at least one of the second side of the retentate plate and the second side of the permeate plate.

13. The cross-flow filtration device of claim 12, wherein the plurality of ridges includes ridges arranged parallel to one another, with a filter channel defined between adjacent ridges.

14. The cross-flow filtration device of claim 12, wherein each of the ridges possesses a triangular cross section.

15. The cross-flow filtration device of claim 12, wherein each ridge possesses a sharp free edge in contact with the membrane.

16. The cross-flow filtration device of claim 12, wherein each ridge possesses a free edge with a radius that is in contact with the membrane.

17. The cross-flow filtration device of claim 12, wherein the membrane possesses a periphery, and further comprising a seal extending around the periphery of the membrane and positioned between the membrane and the at least one of the second side of the retentate plate and the second side of the permeate plate to further suspend the membrane.

18. The cross-flow filtration device of claim 17, wherein the seal possesses a free end positioned in an undercut groove in the at least one of the second side of the retentate plate and the second side of the permeate plate.

* * * * *